United States Patent

Moore

[11] Patent Number: 5,855,097
[45] Date of Patent: Jan. 5, 1999

[54] LANDSCAPE TIE FASTENER

[76] Inventor: Kenneth N. Moore, 7976 Chestnut Grove Rd., Esmont, Va. 22937

[21] Appl. No.: 961,679

[22] Filed: Oct. 31, 1997

[51] Int. Cl.$^6$ .............................. E02D 27/00; E02B 3/12; F16B 15/00
[52] U.S. Cl. .................. 52/102; 405/16; 411/461
[58] Field of Search ..................... 411/457, 461, 411/920; 405/16, 21; 52/102, 103, 104

[56] References Cited

U.S. PATENT DOCUMENTS

| 2,867,807 | 1/1959 | Anstett | 411/920 X |
| 3,869,957 | 3/1975 | Barth et al. | 411/461 X |
| 4,832,557 | 5/1989 | Jacobsen | 411/485 |
| 5,020,272 | 6/1991 | Herrema et al. | 52/102 X |
| 5,478,165 | 12/1995 | Correia et al. | 52/102 X |

FOREIGN PATENT DOCUMENTS

| 52-19440 | 2/1977 | Japan | 52/102 |

*Primary Examiner*—Neill Wilson

[57] ABSTRACT

A combination of a rectangular-shaped landscape tie held in position by a heavy U-shaped member wherein said U-shaped member surrounds three sides of the tie with long pointed arms extending into the ground with the U-shaped member having sufficient strength to withstand driving into the ground by hammering on the top of the U-shaped member.

4 Claims, 3 Drawing Sheets

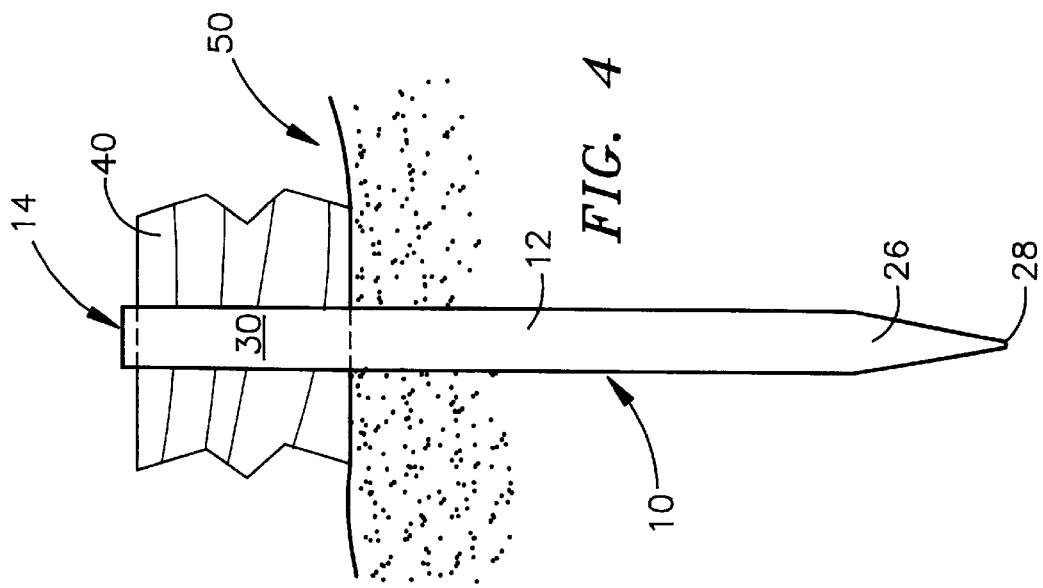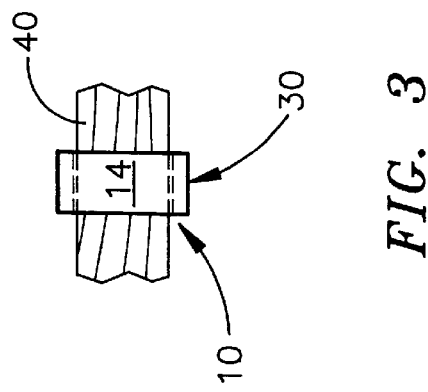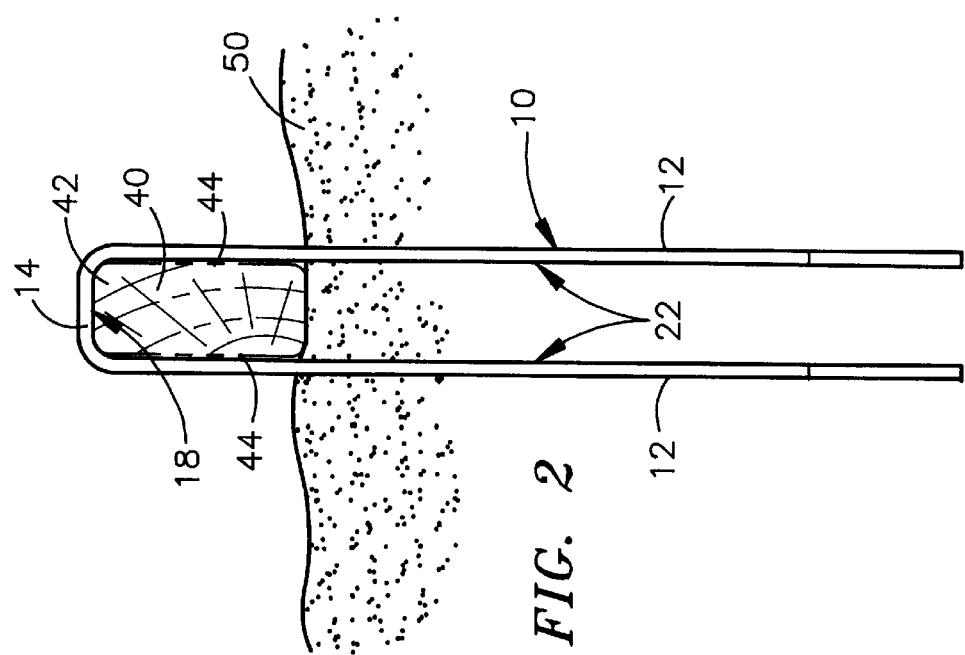

LANDSCAPE TIE FASTENER

FIELD OF THE INVENTION

This invention relates to a decorative landscape border consisting of landscape ties and U-shaped securing members which secure the ties to the ground and to a method for securing landscape ties to the ground. The invention consists of a rigid U-shaped member that straddles the tie and is hammered into the ground until the inner periphery of the U-shaped member contacts the tie. Additional U-shaped members are spaced appropriately along the tie and driven into the ground in the same manner until the tie is securely fastened to the ground. The U-shaped member and the landscape ties comprise the apparatus of the invention which is a decorative landscape border. The method of this invention consists of securing a tie to the ground by driving in the U-shaped members at appropriate intervals along the length of the tie.

BACKGROUND OF THE INVENTION

Wooden planks are commonly used to form decorative landscape ties around houses and other structures. The most common method of securing these wooden planks to the ground are by drilling an appropriately sized hole in the plank at appropriate intervals and driving long nails or portions of iron rods through the holes and into the ground.

The present art of using nails or rods to secure landscape ties has the disadvantage that it requires the installer to purchase a drill bit large enough to accommodate the nails or rods. A second disadvantage with the present art involves the actual work and time expended in drilling the holes. A third disadvantage of the present art is that the nails or rods add no decorative appeal to the finished landscape design and, in fact, the intention is to hide the nails or rods from view as much as possible. A last disadvantage would be that it is not feasible to install certain sized landscape ties, for example 2"×4" ties installed with the short sides in contact with the ground, with nails or rods as the holes required for the large nails or rods would excessively weaken the tie at the position where the holes were drilled.

It is therefore an object of the present invention to eliminate the disadvantages incurred with using the present art methods of creating a decorative landscape border.

SUMMARY OF THE INVENTION

An improved apparatus and method have been developed for creating a decorative landscape border for the exterior of a home or other structure. The invention consists of a combination of a rectangular-shaped landscape tie held in position by a plurality of heavy U-shaped members. Each U-shaped member surrounds three sides of the tie with long pointed arms extending into the ground. The U-shaped members have sufficient strength to withstand driving into the ground by hammering on the top of each U-shaped member.

OBJECTS AND ADVANTAGES

As compared to present art methods of creating a decorative landscape border, the present invention has as one advantage that it does not require the installer to purchase a drill bit large enough to accommodate nails or rods. A second advantage over the prior art is that work and time are not expended in drilling holes. A third advantage of the present invention is that the U-shaped members can be used to add a pleasing visual effect to the finished decorative border. The present invention also has the advantage of allowing the use of smaller ties, such as 2"×4" ties installed with the short sides in contact with the ground, without excessively weakening the ties as would the present method at the position where the holes were drilled.

Other objects and advantages of the preferred embodiment will become apparent when reading the attached description of the invention and referring to the associated drawings.

DESCRIPTION OF THE DRAWINGS

FIG. 2 is a cross-sectional view of a tie showing the long arms of the U-shaped member driven into and securing the tie to the ground.

FIG. 3 is an overhead view of the U-shaped member and a section of a tie showing the portion of the U-shaped member that remains above the ground after the arms of the U-shaped member are driven into the ground.

FIG. 4 is a cross-sectional view of the ground showing a portion of a tie and a side view of the U-shaped member securing the tie to the ground.

DESCRIPTION OF THE INVENTION

The invention consists of an apparatus and method for creating a decorative landscape border for the exteriors of homes or other structures.

Figure 1:
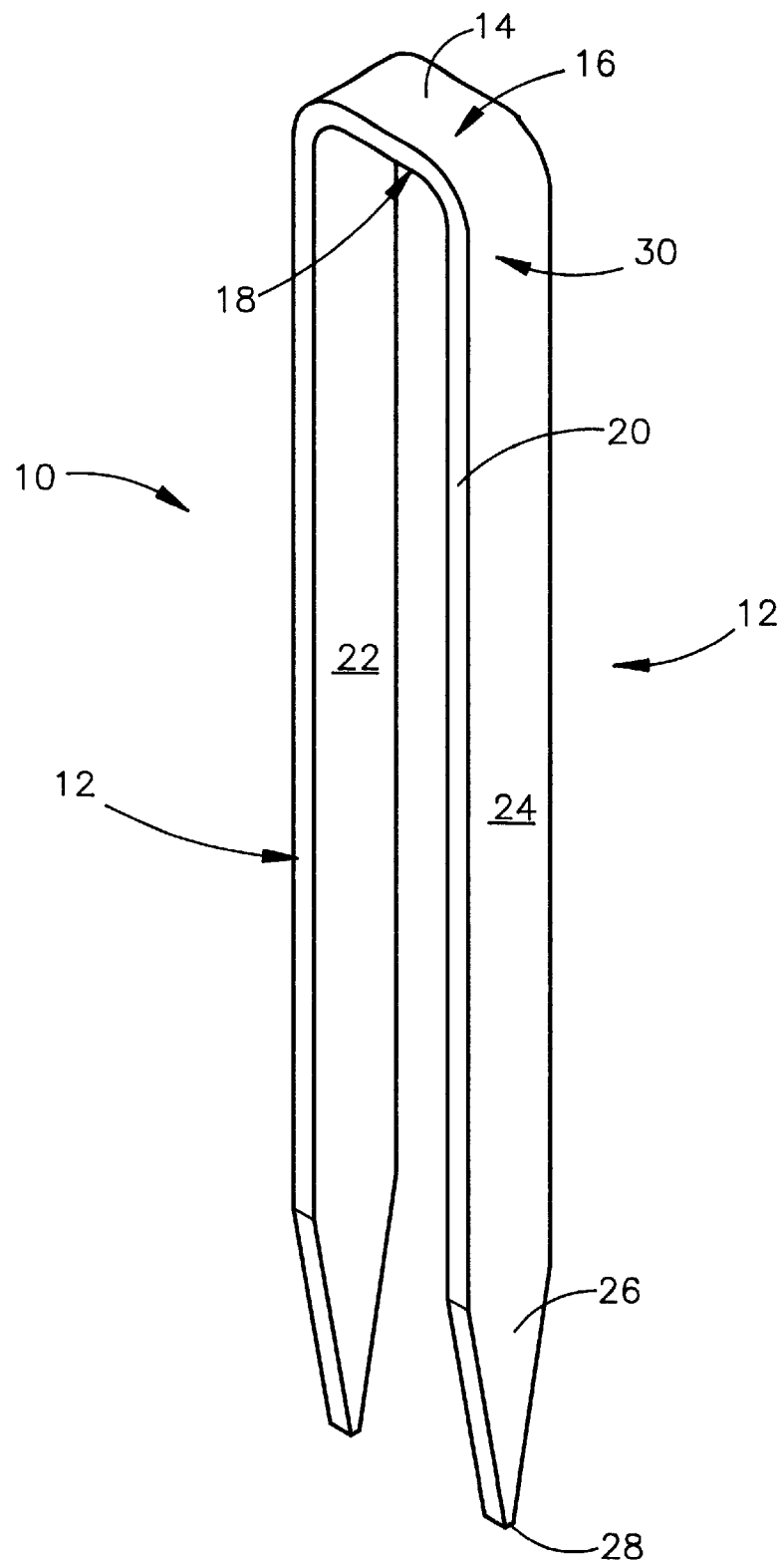
FIG. 1 is a perspective view of the U-shaped member of the present invention.

The invention consists of a combination of a rectangular-shaped landscape tie held in position by a heavy U-shaped member wherein the U-shaped member surrounds three sides of the tie with long pointed arms extending into the ground. FIG. 1 is a perspective view of the U-shaped member of the present invention. Referring to FIG. 1, the U-shaped member 10 is shown having two long arms 12 extending from the U-shaped top 14 of the member. The U-shaped top 14 of the member 10 includes an outer periphery 16 and an inner periphery 18 (not shown). The long arms 12 are of a given thickness 20 and consist of an inner surface 22 and an outer surface 24. The ends 26 of the long arms 12 are shaped into sharp points 28.

FIG. 2, a cross-sectional view of a tie 40 showing the long arms 12 of the U-shaped member 10 driven into and securing the tie 40 to the ground 50 illustrates the present invention, a combination of a rectangular-shaped landscape tie 40 held in position by a heavy U-shaped member 10 wherein the U-shaped member surrounds three sides of the tie 40 with long pointed arms 12 extending into the ground 50. As shown in FIG. 2, the U-shaped member 10 is driven into the ground 50 until its inner periphery 18 contacts the top 42 edge of the landscape tie 40. When fully driven into the ground 50, the sides 44 of the landscape tie 40 are in contact with the inner surfaces 22 of each long arm 12. By driving an appropriate number of U-shaped members into the ground along the length of the landscape tie, the tie will be held securely in place.

FIG. 3 is an overhead view of the portion of the U-shaped member 10 that remains above the ground after the arms of the U-shaped member are driven into the ground and a section of a tie 40. A decorative design, such as Celtic, country, or contemporary, can be formed in the top 14 or side of the U-shaped member 10 in what becomes the exposed side 30 of the U-shaped member to enhance the aesthetic effect of the present invention. FIG. 4 is a cross-sectional view of the ground 50 showing a portion of a tie 40 and a side view of the U-shaped member 10 securing the tie 40 to the ground 50. The U-shaped member 10 must be constructed of sufficient strength to withstand driving into the ground by hammering on the top 14 of the U-shaped member 10 and to resist outward spreading of the arms 12 of the U-shaped member. FIG. 4 illustrates the sharpened points 28 at the end 26 of the arm 12 which enhances the ease of hammering the U-shaped member into the ground. The exposed side 30 of the U-shaped member 10 which may contain a decorative design is depicted in the figure.

Figure 5:
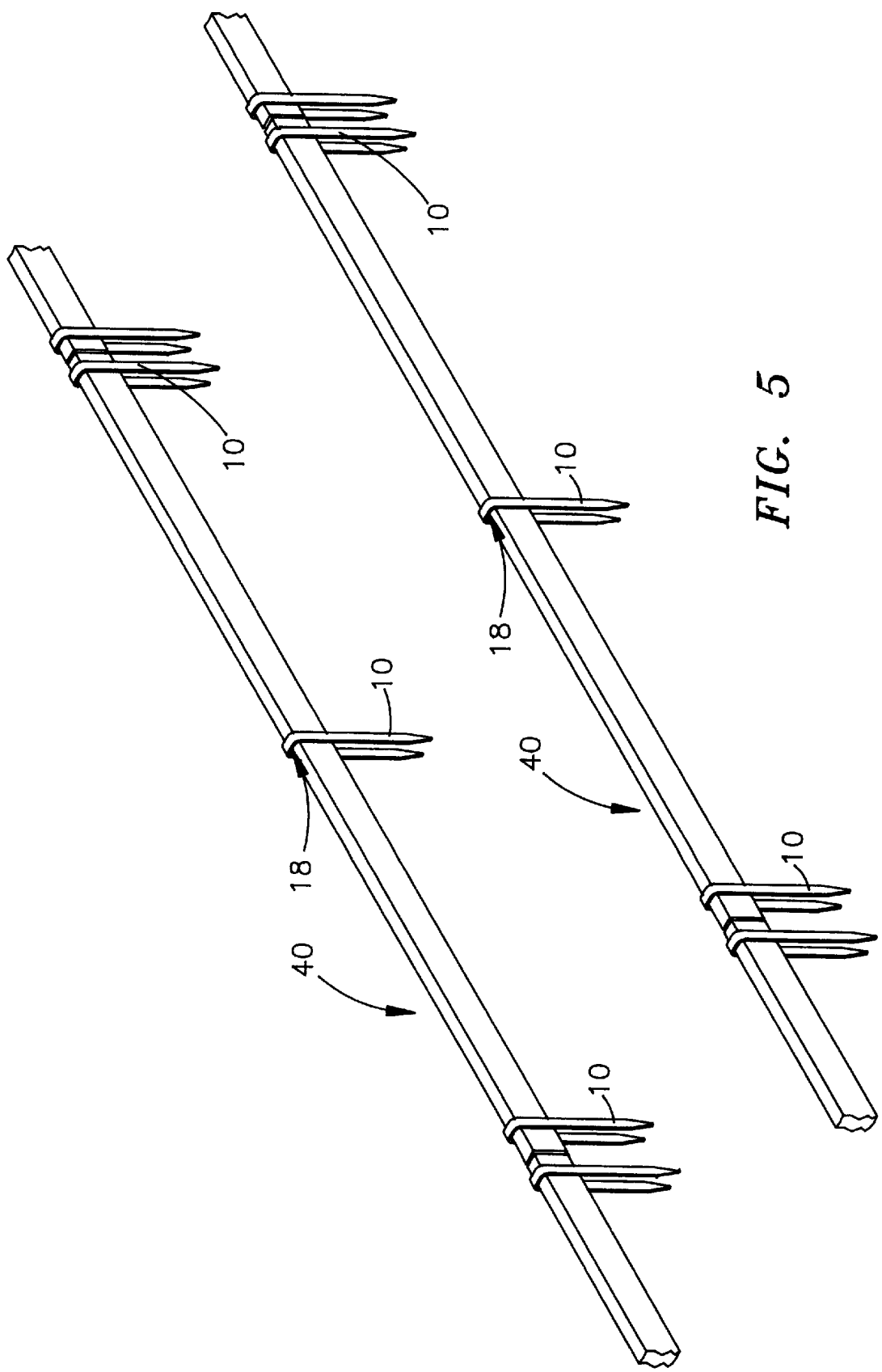
FIG. 5 is a perspective view of two parallel ties and typical spacing of U-shaped members along the ties to secure the ties to the ground.

FIG. 5 is a perspective view of two parallel ties 40 and typical spacing of U-shaped members 10 along the ties 40 to secure the ties to the ground (not shown). FIG. 5 illustrates the present invention's method of securing landscape ties to the ground by providing a landscape tie 40, providing U-shaped securing members 10, placing the landscape tie 40 on the ground in the proper position for landscaping, straddling the landscape tie 40 with a first U-shaped securing member 10 near one end of the tie 40 or at some other appropriate intermediate position of the tie 40, hammering the first U-shaped securing member 10 into the ground until the inner periphery 18 of the U-shaped portion of the U-shaped member 10 contacts the tie 40, and continuing with straddling and hammering of the landscape tie 40 with additional U-shaped members 10 at appropriate intervals along the length of the tie 40 until the tie is firmly secured to the ground. Additional ties can then be positioned against the first tie and secured in the same manner to continue the decorative landscape border.

Referring to FIG. 1, typical dimensions for a U-shaped member 10 for securing 2×4" planks to the ground would be 16.5 inches for the length of the arms 12, 0.280 inches for the thickness 20, 1.0 inch for the width of the arms 12, and 1.575 inches between the inner surfaces 22 of the arms 12. For securing a 4×4" plank, typical dimensions would be 16.5 inches for the length of the arms 12, 0.220 inches for the thickness 20, 1.45 inches for the width of the arms 12, and 3.45 inches between the inner surfaces 22 of the arms 12.

It is to be noted that the U-shaped member 10 has a sharp 90° bend with only a small radius at the juncture between the arms 12 and the top 14. Also, it is to be noted that the U-shaped member is preferably made from a piece of steel bar stock, such as a 0.28 inch thick by 1.00 inch width bard, which is cut to length, points cut at the ends, and bent into the shape of a U. The points 28 can be a single diagonal cut rather than two cuts as shown. This helps to save material and eliminates cuts. The U-shaped member 10 has arms 12 which are at least three times the height of the tie 40. Also, the thickness 20 should be between ³⁄₁₆ inch and ½ inch.

With reference to FIG. 5, it is seen that the U-shaped members provide a decorative wrought iron look. The ties 40 are used in their original rectangular form without any notches being cut into the ties and no additional holding members such as reinforcing bar or spikes are needed.

Having thus described the invention with reference to a preferred embodiment, it is to be understood that the invention is not so limited by the description herein but is defined as follows by the appended claims.

What is claimed is:

1. A combination of a rectangular-shaped landscape tie held in position by a heavy U-shaped member comprising:

an elongated rectangular-shaped landscape tie having a height, a width and two ends;

a U-shaped member having two parallel arms having a length at least three times said height of said landscape tie;

pointed ends on each of said parallel arms; and a top member connecting one end of both of said parallel arms so that the distance between said parallel arms is approximately equal to said width of said landscape tie with said top member constructed of sufficient strength to withstand hammer blows for driving said U-shaped member into the ground so that said top member and said parallel arms straddle said landscaping tie near said ends to hold said landscape tie on the ground.

2. A fastening device for holding a rectangular shaped landscape tie in position comprising:

a metal U-shaped member having two parallel arms at least three times the height of said landscape tie;

pointed ends at a first end of each of said arms; and a top member which connects each of said arms at a second end of said arms constructed of sufficient strength to withstand hammer blows so as to be capable of being driven into the ground.

3. The fastening device of claim 2 wherein said U-shaped member is made from a single piece of steel bar stock approximately 16.5 inches long, approximately 1 inch to 1.45 inch wide, approximately 1.575 inches between the inner surfaces of said U-shaped member and approximately 0.220 inches to 0.280 inches thick.

4. A method of securing landscape ties to the ground comprising:

providing a landscape tie having a width, a height and two ends;

providing U-shaped members having a length at least three times the height of said landscaping tie and an inside width the width of said landscaping tie;

placing said landscape tie on the ground in the proper position for landscaping;

straddling said landscape tie with a first of said U-shaped members near one end of said tie or at some other appropriate intermedicate position of said tie;

hammering said first U-shaped into the ground until the inner periphery of the U-shaped portion of said first securing tie contacts said tie;

continuing with straddling and hammering of said landscape tie with said U-shaped members at appropriate intervals of said tie until said tie is firmly secured to the ground.

* * * * *